(12) United States Patent
Nishizawa et al.

(10) Patent No.: US 7,599,587 B2
(45) Date of Patent: Oct. 6, 2009

(54) WAVELENGTH SELECTIVE SWITCH

(75) Inventors: Toshiki Nishizawa, Yokohama (JP); Kenji Kobayashi, Yokohama (JP); Yuji Mitsuhashi, Yokohama (JP); Hiroshi Tomita, Yokohama (JP)

(73) Assignee: NTT Electronics Corporation, Kanagawa (JP)

( * ) Notice: Subject to any disclaimer, the term of this patent is extended or adjusted under 35 U.S.C. 154(b) by 0 days.

(21) Appl. No.: 12/201,677

(22) Filed: Aug. 29, 2008

(65) Prior Publication Data

US 2009/0067780 A1    Mar. 12, 2009

(30) Foreign Application Priority Data

Sep. 10, 2007    (JP)    ............................. 2007-233837

(51) Int. Cl.
G02B 6/26    (2006.01)

(52) U.S. Cl. .............................. 385/18; 385/37; 385/47

(58) Field of Classification Search ............. 385/16–18, 385/31, 37, 47

See application file for complete search history.

(56) References Cited

U.S. PATENT DOCUMENTS 7,072,539 B2 *    7/2006    Wu et al. ...................... 385/18

FOREIGN PATENT DOCUMENTS

| JP | 2003-101479 | 4/2003 |
| JP | 2006-276216 | 10/2006 |
| JP | 2006-284740 | 10/2006 |

* cited by examiner

Primary Examiner—Frank G Font
Assistant Examiner—Michael P Mooney
(74) Attorney, Agent, or Firm—Darby & Darby P.C.

(57) ABSTRACT

In a wavelength selective switch according to the present invention, an isolator is disposed between a lens array and a first lens. The isolator includes an isolator element and a transmitting means. The isolator is disposed so that the isolator element is on light paths of input lights and that the transmitting element is on a light path of an output light. The isolator element is shared among the light paths of the plurality of input lights. The isolator element intercepts lights propagating in an opposite direction to the input lights and prevents coupling of the lights to input ports. The transmitting element transmits the output light and couples it to an output port.

12 Claims, 11 Drawing Sheets

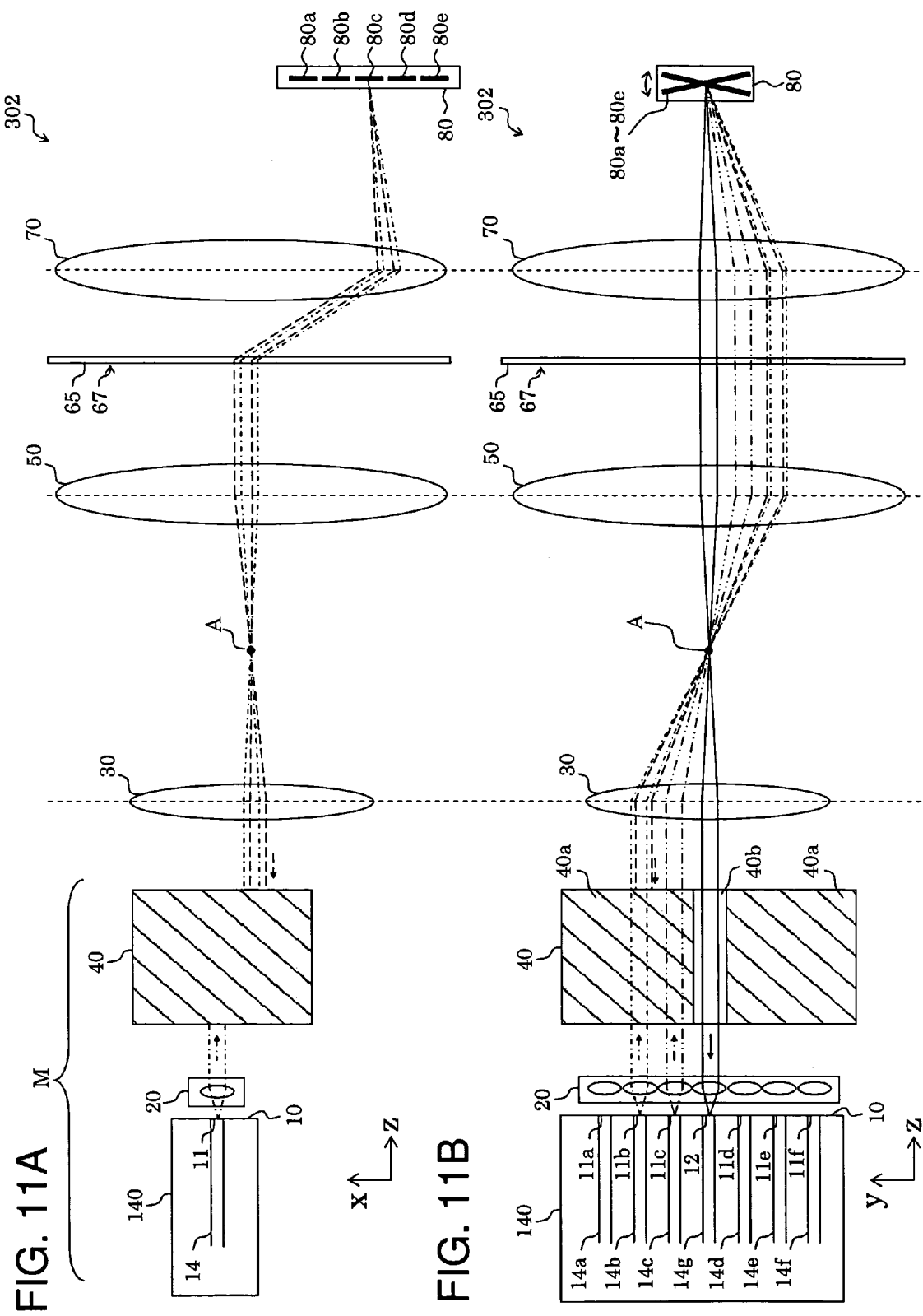

US 7,599,587 B2

WAVELENGTH SELECTIVE SWITCH

CROSS-REFERENCE TO RELATED APPLICATION

The present application is based on, and claims priority from, J.P. Application 2007-233837, filed Sep. 10, 2007, the disclosure of which is hereby incorporated by reference herein in its entirety.

BACKGROUND OF THE INVENTION

1. Field of the Invention

The present invention relates to a wavelength selective switch that can demultiplex or multiplex lights of different wavelengths in optical wavelength division multiplexing transmission.

2. Description of the Related Art

As the optical wavelength division multiplexing transmission becomes widespread, the wavelength selective switch for multiplexing or demultiplexing a light signal depending on wavelengths has become a key device of the optical transmission.

Here, FIG. 1 shows a schematic block diagram of a prior-art wavelength selective switch. Input/output ports 101 refer to all input/output ports (input/output ports 101a to 101e in FIGS. 1 and 2) at an input/output terminal 100. Waveguides 14 refer to all waveguides (waveguides 14a to 14e in FIGS. 1 and 2) in a fiber array 140.

The wavelength selective switch 200 in FIG. 1 includes a lens array 102 for converting lights into parallel lights, the lights output from the input/output ports 101 of the input/output terminal 100 disposed at a focal position, a first lens 103 with a high numerical aperture and for converging the lights from the lens array 102, a second lens 104 disposed to have a focal position in common with the first lens 103, a spectral element 105 for reflecting the lights from the second lens 104 at different angles for respective wavelengths, and a mirror array 106 disposed at the focal position of the second lens 104 to reflect the lights that have passed through the second lens 104 from the spectral element 105 at arbitrary angles toward the second lens 104 (e.g., see Japanese Laid-Open Patent Publication NO. 2003-101479; Japanese Laid-Open Patent Publication No. 2006-276216; and Japanese Laid-Open Patent Publication No. 2006-284740).

With this, the lights reflected by the mirror array 106 at the arbitrary angles can be converged on different input/output ports for different wavelengths according to angles of individual micromirrors of the mirror array 106. In this way, the first lens 103 has functions of changing angles of the lights that have been reflected by the spectral element 105 and passed through the second lens 104 out of the lights reflected by the mirror array 106 and giving offsets to optical axes of the lights from the input/output ports 101.

FIG. 2 shows a schematic block diagram of a wavelength selective switch 200' in which the reflective spectral element 105 in FIG. 1 is replaced with a transmissive spectral element 105'. Parts having the same functions as those of the wavelength selective switch 200 in FIG. 1 are provided with the same reference numerals. A third lens 104' in FIG. 2 has the same functions performed for the lights from the spectral element 105' to a mirror array 106 as the second lens 104 in FIG. 1.

In a case of an N-input and 1-output (Add-type) wavelength selective optical switch, one of input/output ports of the wavelength selective switch 200' can be used as an output port and the others can be used as input ports in FIG. 2. In the following description, they will be referred to as an output port 101c, an input port 101a, an input port 101b, an input port 101d, and an input port 101e.

Wavelength-multiplexed light signals are emitted as diverging lights from the input ports 101 through the waveguides 14 in the fiber array 140. For example, the light signal (two-dot chain line) emitted as the diverging light from the input port 101b enters a lens array 102 to be converted into a parallel light and enters a first lens 103. The light signal that enters the first lens 103 is converted into a converging light, forms an image at a point A, turns into the diverging light again, enters the second lens 104 to be converted into a parallel light again, and enters the spectral element 105. The light signal that enters the spectral element 105 is demultiplexed into respective wavelengths, enters the third lens 104' to be converted into a converging light, and forms images for respective wavelengths at the mirror array 106 as shown in FIG. 3. For example, a micromirror 106c in FIG. 3 is inclined at an angle α that is necessary to cause an incident light signal λ3 to enter the output port 101c and the light signal λ3 enters the third lens 104' as a diverging light shown by solid lines in FIG. 2. The reflected light signal that has entered the third lens 104' is converted into a parallel light, passes through the spectral element 105, enters the second lens 104 to be converted into a converging light, and forms an image at the point A. The reflected light signal that has formed the image at the point A turns into a diverging light, enters the first lens 103 to be converted into a parallel light, enters the lens array 102 to be converted into a converging light, is coupled to the output port 101c, and is transmitted through the fiber array 101.

Here, if a wavelength-multiplexed light signal is also emitted simultaneously from the input port 101a, it forms a light path as shown by a one-dot chain line in FIG. 2, is demultiplexed by the spectral element 105, and forms an image at the mirror array 106 as in FIG. 2. For example, because the micromirror 106c is already inclined at the angle α, the light signal λ3 that has formed the image on the micromirror 106c is reflected in a light path shown in a broken line in FIG. 2 and enters not the output port 101c but a vicinity of the input port 101a. To cope with this, an in-line isolator 109 is inserted into midway of fibers of the fiber array corresponding to the input ports to thereby prevent the light signals from propagating in an opposite direction through the fibers.

SUMMARY OF THE INVENTION

However, because in-line isolators are inserted into all the input ports in the prior-art wavelength selective switch, treatment of excessive lengths of the fibers in a module and coupling of the in-line isolators and the waveguides are difficult and the module increases in size. Moreover, the same number of in-line isolators as the input ports are required, which increases a manufacturing cost.

Therefore, it is an object of the present invention to provide a small wavelength selective switch with a low manufacturing cost.

To achieve the above object, in a wavelength selective switch according to the invention, a bulk-type isolator shared among all input ports is disposed at a portion where lights are parallel lights in a module.

To put it concretely, a wavelength selective switch according to the invention includes: an input/output terminal provided with a plurality of input ports from which input lights including one or more wavelengths are input and at least one output port to which an output light is output arranged in a straight row; a lens array disposed to face the input/output terminal to convert the respective input lights from the input ports into parallel lights and to couple the output light to the output port; an isolator disposed on an opposite side to the input/output terminal with the lens array interposed therebetween, having an isolator element provided on light paths of the input lights and shared among the light paths of the respective input lights to intercept lights propagating in an opposite direction to the input lights, and having a transmitting means provided on a light path of the output light to transmit the output light and couple it to the lens array; a first lens disposed on an opposite side to the lens array with the isolator interposed therebetween to converge the respective input lights from the isolator on a focus and diffuse them and to convert the output light into a parallel light and couple it to the transmitting means of the isolator; a second lens disposed on an opposite side to the isolator with the first lens interposed therebetween to convert the respective input lights from the first lens into parallel lights and to converge the output light on a focus, then diffuse it, and couple it to the first lens; a spectral element disposed on an opposite side to the first lens with the second lens interposed therebetween to reflect the respective input lights at different angles for the respective wavelengths on a grating surface formed by forming a plurality of gratings parallel to an arranged direction of the input ports and the output port at the input/output terminal on a face receiving the input lights and couple them again to the second lens and to reflect the output light as it is and couple it to the second lens; and a mirror array disposed on an opposite side to the spectral element with the second lens interposed therebetween while displaced from a central axis connecting the first lens and the second lens, having micromirrors for the respective wavelengths which lights of the respective wavelengths of the input lights enter individually after the input lights are reflected by the spectral element and the respective wavelengths of the input lights are converged by the second lens, and reflecting a light of a desired wavelength of a desired input light as the output light to couple it to the output port via the second lens, the spectral element, the second lens again, the first lens, the isolator, and the lens array, in this order.

A wavelength selective switch according to the invention includes: an input/output terminal provided with a plurality of input ports from which input lights including one or more wavelengths are input and at least one output port to which an output light is output arranged in a straight row; a lens array disposed to face the input/output terminal to convert the respective input lights from the input ports into parallel lights and to couple the output light to the output port; an isolator disposed on an opposite side to the input/output terminal with the lens array interposed therebetween, having an isolator element provided on light paths of the input lights and shared among the light paths of the respective input lights to intercept lights propagating in an opposite direction to the input lights, and having a transmitting means provided on a light path of the output light to transmit the output light and couple it to the lens array; a first lens disposed on an opposite side to the lens array with the isolator interposed therebetween to converge the respective input lights from the isolator on a focus and diffuse them and to convert the output light into a parallel light and couple it to the transmitting means of the isolator; a second lens disposed on an opposite side to the isolator with the first lens interposed therebetween to convert the respective input lights from the first lens into parallel lights and to converge the output light on a focus, then diffuse it, and couple it to the first lens; a spectral element disposed on an opposite side to the first lens with the second lens interposed therebetween to transmit the respective input lights at different angles for the respective wavelengths on a grating surface formed by forming a plurality of gratings parallel to an arranged direction of the input ports and the output port at the input/output terminal on a face receiving the input lights and to transmit the output light as it is and couple it to the second lens; a third lens disposed on an opposite side to the second lens with the spectral element interposed therebetween to individually converge lights of the respective wavelengths of the respective input lights from the spectral element after the input lights are separated into the respective wavelengths and to convert the output light into a parallel light and couple it to the spectral element; and a mirror array disposed on an opposite side to the spectral element with the third lens interposed therebetween, having micromirrors for the respective wavelengths which are shared among the respective input lights and which lights of the respective wavelengths of the input lights enter, respectively, after the input lights are converged by the third lens, and reflecting a light of a desired wavelength of a desired input light as the output light to couple it to the output port via the third lens, the spectral element, the second lens, the first lens, the isolator, and the lens array, in this order.

The lights between the lens array and the first lens are parallel lights. By disposing the bulk-type isolator shared among the input lights there, additional treatment of excessive lengths of fibers and combination of lenses for making the parallel light become unnecessary. Therefore, the invention can provide a small wavelength selective switch with the low manufacturing cost.

Spaces between the input ports and the output ports are preferably wider than spaces between the input ports at the input/output terminal of the wavelength selective switch according to the invention.

Because an area of the isolator element of the isolator to be irradiated with lights can be increased, satisfactory isolation characteristics can be obtained for the input ports adjacent to the output port and uniform isolation characteristics can be obtained for all the input ports. A vignetting loss of the reflected light signal that enters the output port due to the isolator element can be reduced. Moreover, mounting tolerance in manufacturing the module can be expanded.

The isolator element of the isolator of the wavelength selective switch according to the invention includes a laminated body formed by laminating a first doubly refracting crystal plate, a rotary polarizer, a compensator, and a second doubly refracting crystal plate in this order in a propagating direction of the input lights and a magnetic field means for applying a magnetic field to the laminated body in a direction perpendicular to the propagating direction of the input lights and perpendicular to the port arranged direction in which the input ports and the output port of the input/output terminal are arranged. It is possible to further reduce the size of the wavelength selective switch.

The input ports may be collected in two input port rows and the output port may be disposed between the two input port rows at the input/output terminal of the wavelength selective switch according to the invention. The two laminated bodies with their first doubly refracting crystal plates, rotary polarizers, compensators, and second doubly refracting crystal plates arranged in the same order may be disposed on both sides of the transmitting means in the port arranged direction and the two magnetic field means may be arranged to sandwich the two laminated bodies and the transmitting means in the direction perpendicular to the port arranged direction and the propagating direction of the input lights in the isolator element of the isolator.

The invention can provide the small wavelength selective switch with the low manufacturing cost.

BRIEF DESCRIPTION OF THE DRAWINGS

FIGS. 4A and 4B are schematic block diagrams of a wavelength selective switch according to the present invention, wherein FIG. 4A is a schematic block diagram in an x-z plane and FIG. 4B is a schematic block diagram in a y-z plane.

FIGS. 11A and 11B are schematic block diagrams of a wavelength selective switch according to the invention, wherein FIG. 11A is a schematic block diagram in an x-z plane and FIG. 11B is a schematic block diagram in a y-z plane.

DETAILED DESCRIPTION OF THE INVENTION

Figure 1:
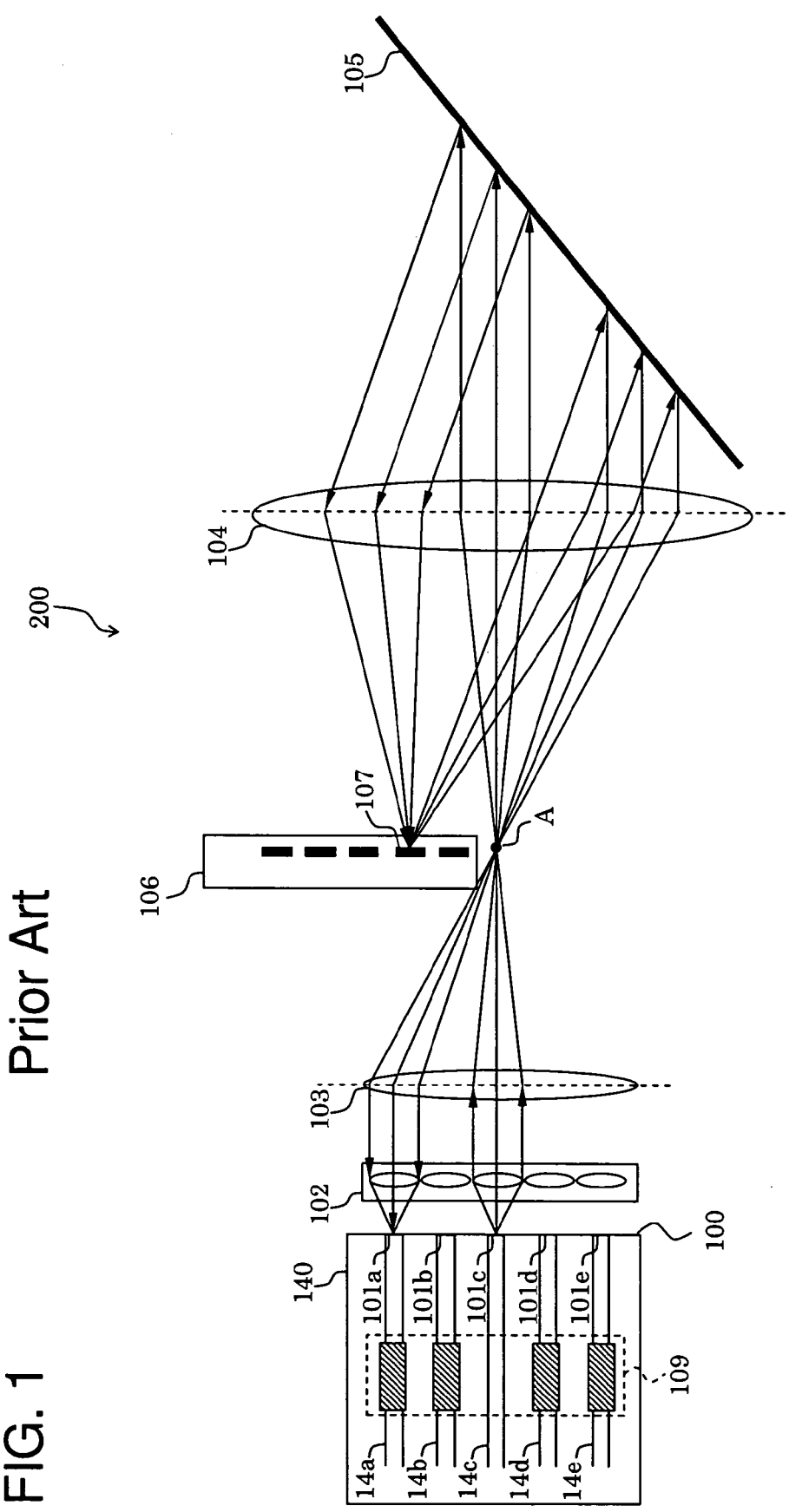
FIG. 1 is a schematic block diagram of a prior-art wavelength selective switch.
Figure 2:
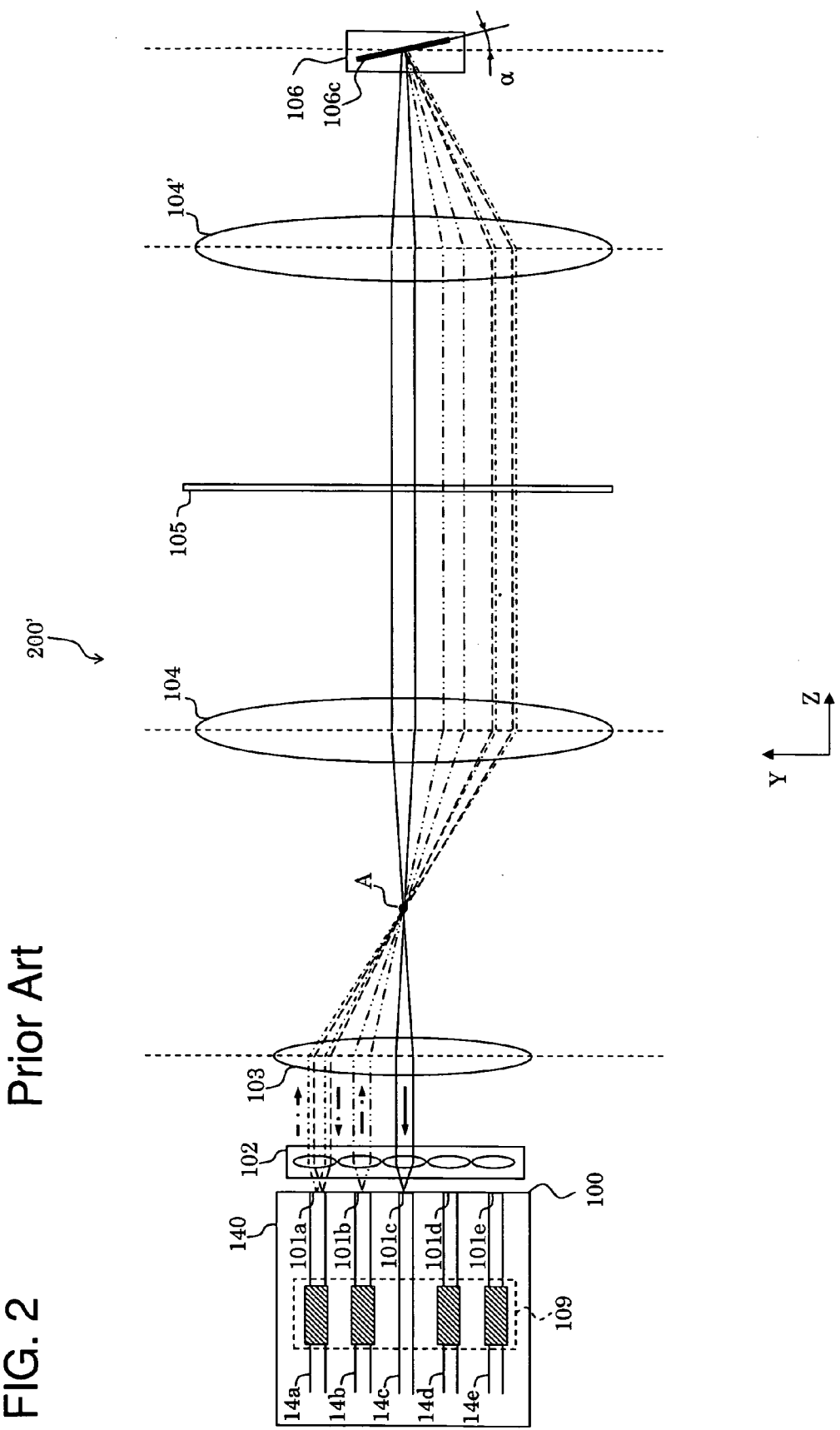
FIG. 2 is a schematic block diagram of the prior-art wavelength selective switch.
Figure 3:
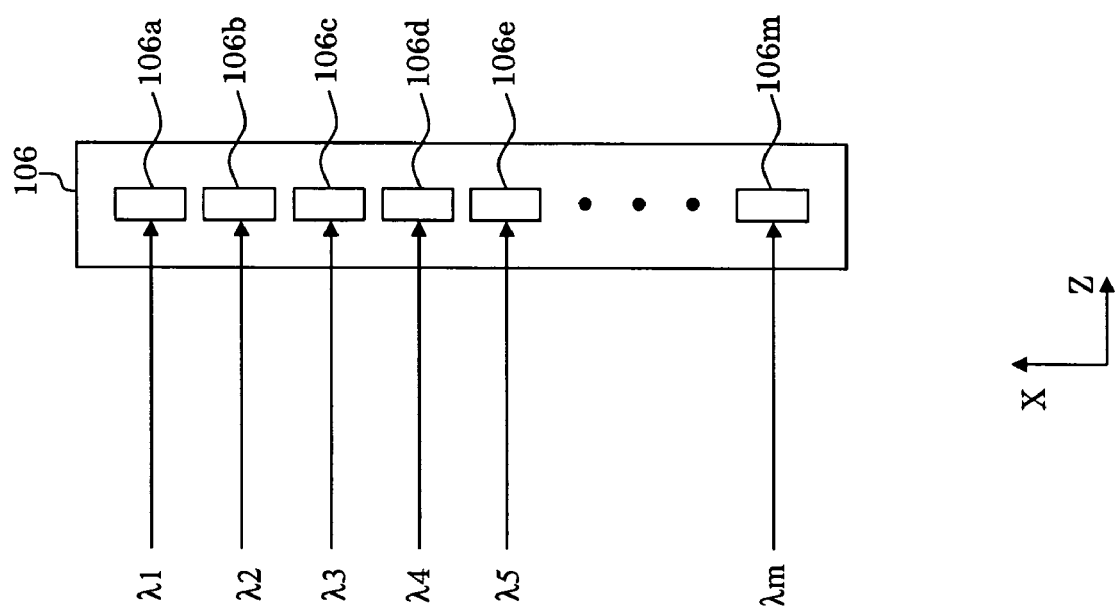
FIG. 3 is a schematic diagram for explaining a mirror array.

The invention of the present application will be specifically described below by concretely showing embodiments, though the invention of the application should not be considered to be restricted to the following description.

First Embodiment

FIGS. 4A and 4B are schematic block diagrams of a wavelength selective switch 301 according to a first embodiment. FIG. 4A shows the wavelength selective switch 301 in an x-z plane and FIG. 4B shows the wavelength selective switch 301 in a y-z plane. In the following explanation, input ports 11 refer to all input ports (input ports 11a to 11h in FIGS. 4A, 4B, 5, 8, 10, and 11) at an input/output terminal 10. Waveguides 14 refer to all waveguides (waveguides 14a to 14e in FIGS. 4A, 4B, 5, 8, 10, and 11) in a fiber array 140.

The wavelength selective switch 301 has a reflective structure, i.e., a structure for reflecting lights with a spectral element 60. The wavelength selective switch 301 in the first embodiment includes: the input/output terminal 10 provided with the input ports 11 from which input lights including one or more wavelengths are input and an output port 12 to which an output light is output arranged in a straight row; a lens array 20 disposed to face the input/output terminal 10 to convert the respective input lights from the input ports 11 into parallel lights and to couple the output light to the output port 12; an isolator 40 disposed on an opposite side to the input/output terminal 10 with the lens array 20 interposed therebetween, having an isolator element 40a provided only on light paths of the input lights and shared among the light paths of the respective input lights to intercept lights propagating in an opposite direction to the input lights, and having a means 40b for transmitting the output light and coupling it to the lens array 20; a first lens 30 disposed on an opposite side to the lens array 20 with the isolator 40 interposed therebetween to converge the respective input lights from the isolator 20 on a focus A and diffuse them and to convert the output light into a parallel light and couple it to the transmitting means of the isolator 20; a second lens 50 disposed on an opposite side to the isolator 20 with the first lens 30 interposed therebetween to convert the respective input lights from the first lens 30 into parallel lights and to converge the output light on the focus A, then diffuse it, and couple it to the first lens 30; a spectral element 60 disposed on an opposite side to the first lens 30 with the second lens 50 interposed therebetween to reflect the respective input lights at different angles for the respective wavelengths on a grating surface 62 formed by forming a plurality of gratings parallel to an arranged direction of the input ports 11 and the output port 12 at the input/output terminal 10 on a face receiving the input lights and couple them again to the second lens 50 and to reflect the output light as it is and couple it to the second lens 50; and a mirror array 80 disposed on an opposite side to the spectral element 60 with the second lens 50 interposed therebetween while displaced from a central axis connecting the first lens 30 and the second lens 50, having micromirrors 80a to 80e for the respective wavelengths which lights of the respective wavelengths of the input lights enter individually after the input lights are reflected by the spectral element 60 and the respective wavelengths of the input lights are converged by the second lens 50, and reflecting a light of a desired wavelength of a desired input light as the output light to couple it to the output port 12 via the second lens 50, the spectral element 60, the second lens 50 again, the first lens 30, the isolator 40, and the lens array 20, in this order.

Figure 4:
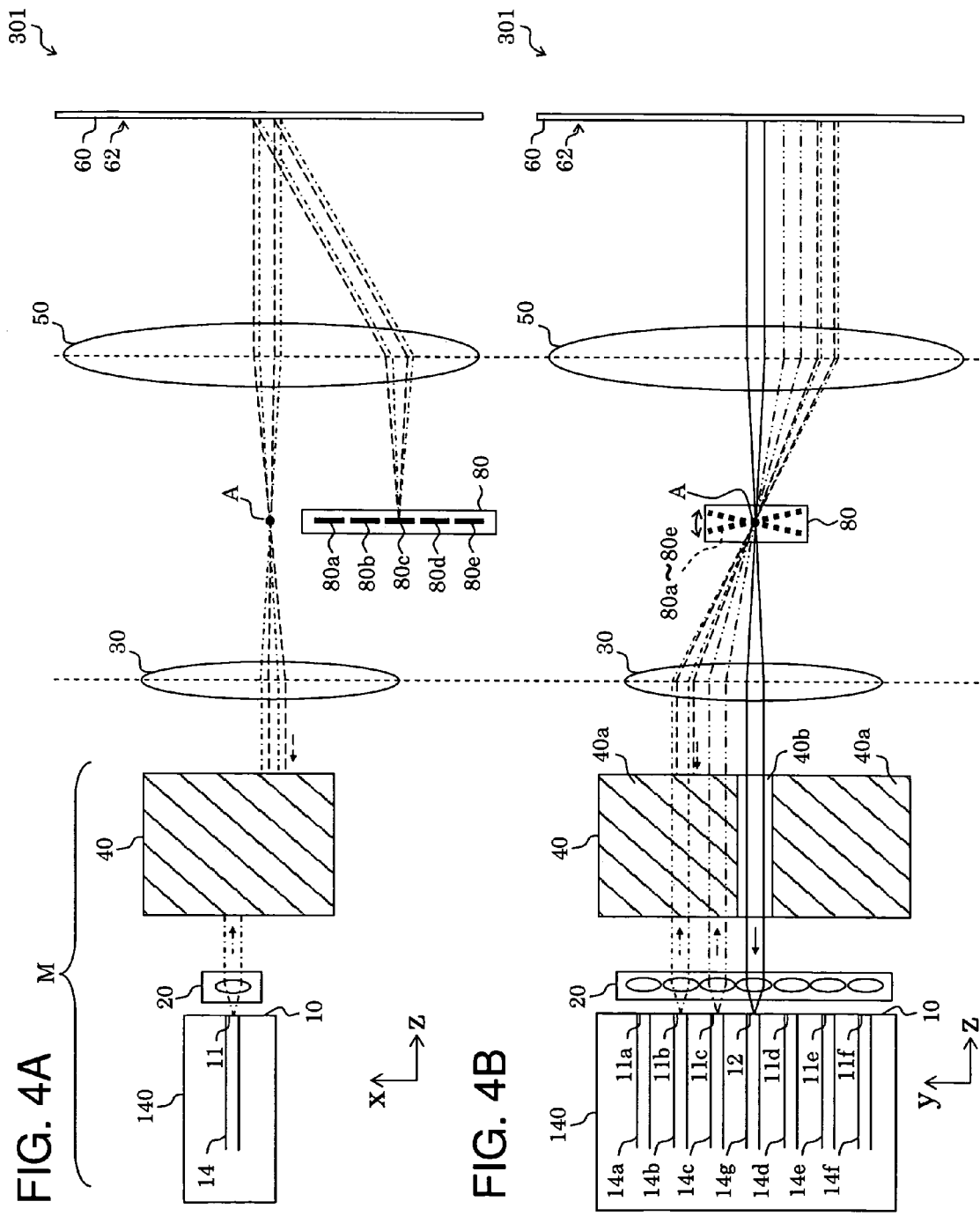

The input/output terminal 10 is an end face of the fiber array 140 provided with the input ports 11 and the output port 12. Although six input ports 11a to 11f are shown in FIG. 4, any number of (more or fewer) input ports may be disposed. Similarly, the number of output port 12 is not necessarily one but may be two or more. For example, the waveguides 14a to 14g are respectively connected to the input ports 11a to 11f and the output port 12 as shown in FIG. 4. The input ports 11a to 11f respectively input lights including one or more wavelengths propagating through the waveguides 14a to 14f, respectively. The output port 12 outputs a light to the waveguide 14g. The input ports 11 and the output port 12 are provided in the straight row. Although the input ports 11 are disposed so that directions of the lights output from the input ports 11 are parallel to the z axis as shown in FIG. 4B, they may be in any orientations if the lights are converted into parallel lights by the lens array 20.

As the lens array 20, there is a microlens array, for example.

As the first lens 30 and the second lens 50, there are a convex lens, a doublet lens formed by bonding and combining proper convex lens and concave lens to reduce optical aberration, and a lens such as a triplet lens formed by combining a plurality of lenses.

On the grating surface 62, the plurality of gratings parallel to a direction of the y axis in FIG. 4B are formed in a direction parallel to a direction of the x axis in FIG. 4A. The gratings may be a plurality of grooves forming recessed and protruding shaped on the grating surface 62 and may include light-reflecting portions and light-absorbing portions arranged alternately. As a result, as shown in FIG. 4A, lights that have passed through the second lens 50 are reflected on the grating surface 62 of the spectral element 60 and reflected at different angles for the respective wavelengths in the direction of the x axis. Because the lights are reflected as they are in the direction of the z axis, the reflected input lights are not shown in FIG. 4B. Although the grating surface 62 of the spectral element 60 directly faces the second lens 501 in FIG. 4 for the sake of simplification, it is normally inclined with respect to an optical axis (z axis) so that the normal to the grating surface 62 is in the x-z plane.

The mirror array 80 includes the micromirrors 80a to 80e. The plurality of micromirrors for the respective wavelengths may be disposed according to the number of wavelengths included in the input light. In the mirror array 80, an angle of inclination of each micromirror can be changed individually. As the micromirror, MEMS (Micro Electro Mechanical Systems) may be employed, for example. In FIG. 4B, the micromirrors 80a to 80e are shown by broken lines because they are behind the focus A.

The isolator 40 includes the isolator element 40a and the transmitting means 40b. The isolator element 40a transmits lights that enter from the lens array 20 side and intercepts lights that enter from the first lens 30 side.

Figure 5:
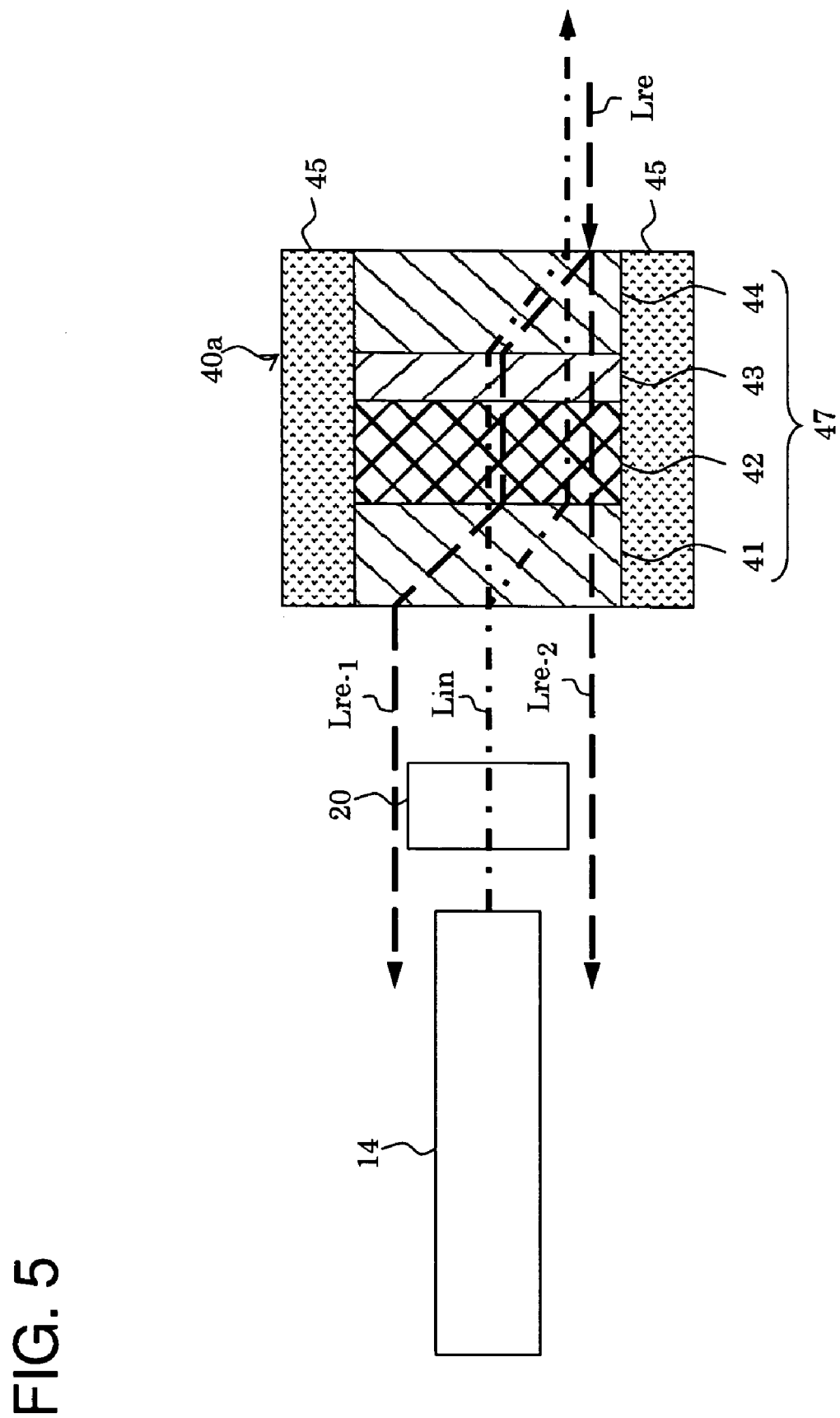
FIG. 5 is a schematic diagram for explaining a function of an isolator.

To explain a function of the isolator 40, FIG. 5 shows a section along the XZ plane of a portion M of the wavelength selective switch 301 in FIG. 4A. Each isolator element 40a includes: laminated bodies 47 each of which is formed by laminating a first doubly refracting crystal plate 41, a rotary polarizer 42, a compensator 43, and a second doubly refracting crystal plate 44 in this order in a propagating direction of the input lights; and magnetic field means 45 for applying magnetic fields to the laminated body 47 in a direction perpendicular to the propagating direction of the input lights and perpendicular to the port arranged direction in which the input ports 11 and the output port 12 of the input/output terminal 10 are arranged. By forming the laminated bodies 47 in this manner, it is possible to make the isolator element 40a polarization-independent. The first doubly refracting crystal plate 41 and the second doubly refracting crystal plate 44 are made of rutile, for example. The rotary polarizer 42 is a Faraday element or a magnetic garnet LPE film, for example. The compensator 42 is a half-wavelength plate, for example. The input light Lin (one-dot chain lines) from the input port 11 is a random polarized light and it is possible to ignore the polarized state to simplify mounting by making the optical isolator element 40a polarization-independent. The reflected light Lre (light from the first lens side) reflected by the mirror array 80 is shown by broken lines.

In the isolator element 40a, the first doubly refracting crystal plate 41 polarizes and separates the input light Lin (one-dot chain line) into lights and the second doubly refracting crystal plate 44 synthesizes and emits them. The second doubly refracting crystal plate 44 polarizes and separates the reflected light Lre (broken line) into lights and the first doubly refracting crystal plate 41 further polarizes and branches them into an ordinary ray $Lre_{-1}$ and an extraordinary ray $Lre_{-2}$ and emits them. Therefore, the ordinary ray $Lre_{-1}$ and the extraordinary ray $Lre_{-2}$ are not coupled to the lens array 20.

The transmitting means 40b transmits the output light and couples it to the lens array 20 as shown in FIG. 4B. The transmitting means 40b is space or glass, for example. Therefore, the output light to be coupled to the output port 12 passes through the transmitting means 40b of the isolator 40 without being intercepted by the isolator element 40a.

Figure 6:
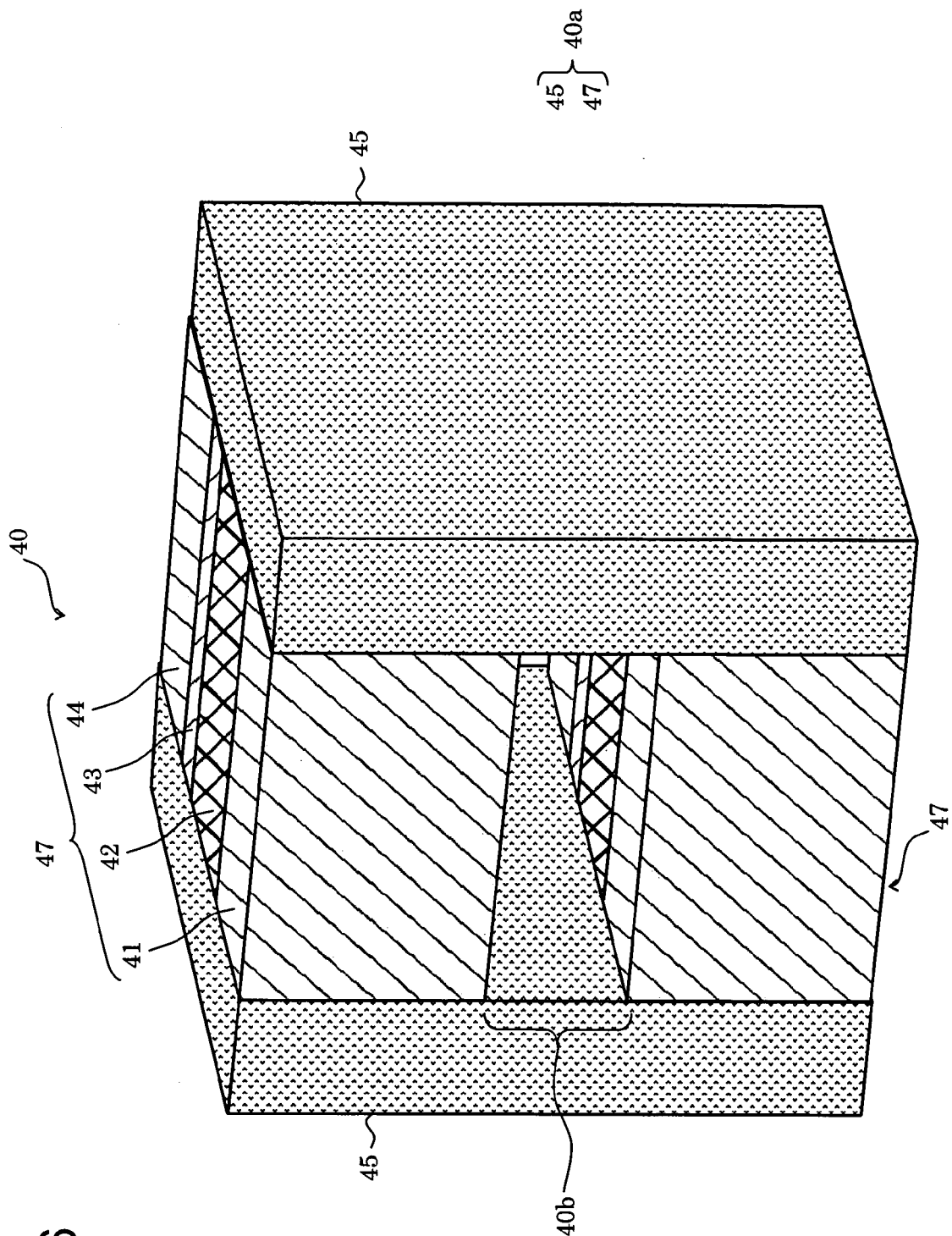
FIG. 6 is a schematic diagram for explaining a structure of the isolator.

Next, the structure of the isolator 40 will be described in detail. FIG. 6 shows an example of the structure of the isolator 40. The isolator 40 includes the isolator element 40a and the transmitting means 40b. To put it concretely, in the isolator element 40a of the isolator 40, the two laminated bodies 47 each having the first doubly refracting crystal plate 41, the rotary polarizer 42, the compensator 43, and the second doubly refracting crystal plate 44 laminated in the same order are disposed on both sides in the port arranged direction of the transmitting means 40b and the two magnetic field means 45 are disposed to sandwich the two laminated bodies 47 and the transmitting means 40b from a direction perpendicular to the port arranged direction and the propagating direction of the input lights. The magnetic field means 45 are magnets, for example. The isolator element 40a is formed by arranging the two laminated bodies 47 so that the input lights propagate through them in the same direction and sandwiching the laminated bodies 47 between the two magnetic field means 45 to apply magnetic fields to the respective laminated bodies 47 in the direction perpendicular to the propagating direction of the input lights and perpendicular to the arranged direction of the input ports 11 and the output port 12 of the input/output terminal. The space between the two laminated bodies 47 functions as the transmitting means 40b. Although the transmitting means 40b is positioned near the center of the isolator 40 in FIG. 6, it may be in a different position from that in FIG. 6 depending on the position of the output port 12.

Figure 7:
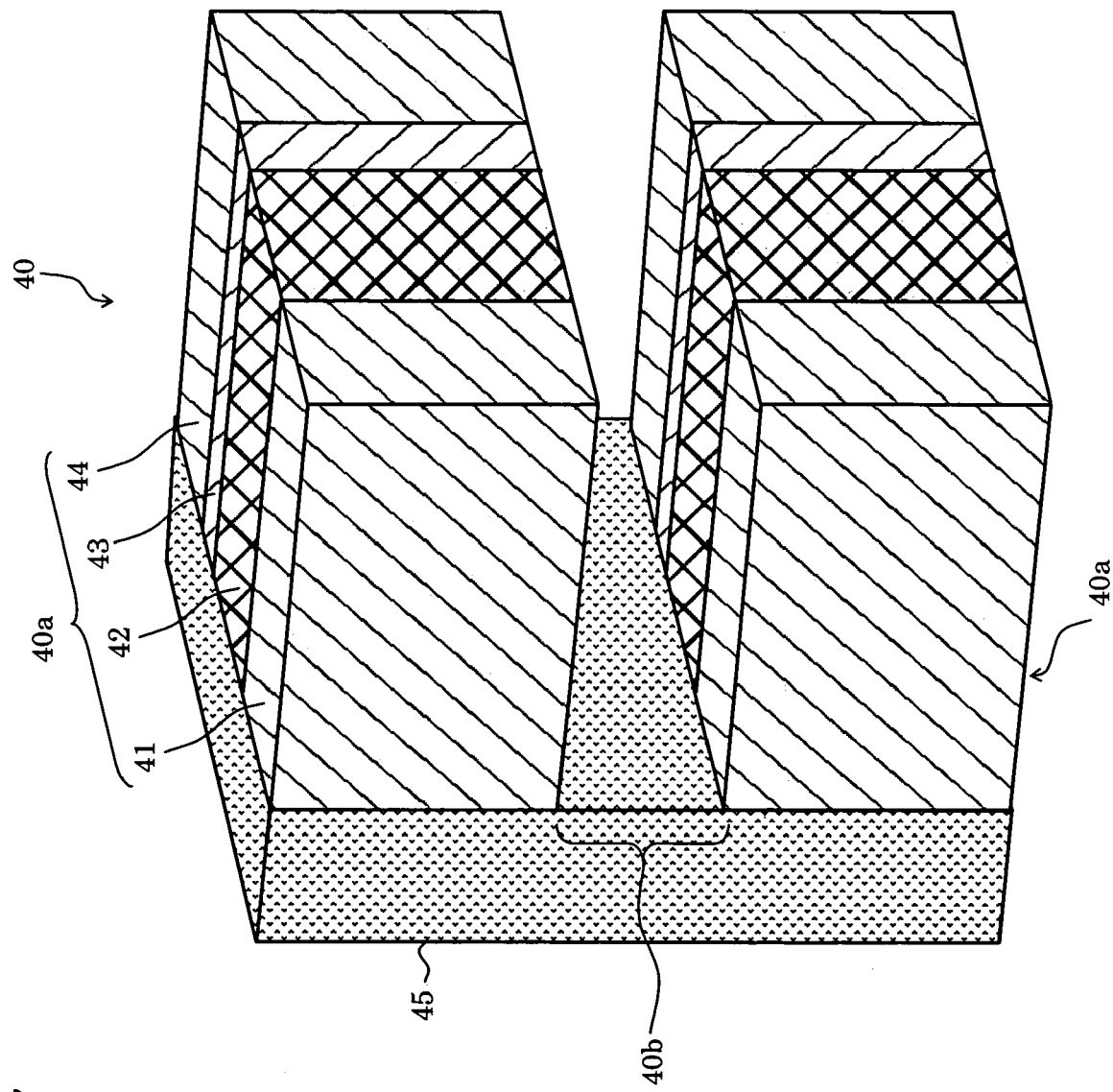
FIG. 7 is a schematic diagram for explaining the structure of the isolator.

Although the isolator 40 in FIG. 6 is formed by sandwiching the laminated bodies 47 between the two magnetic field means 45, only one of the magnetic field means 45 may be provided as shown in FIG. 7 or the two laminated bodies 47 may be surrounded with the magnetic field means 45 in a square shape or an angular U shape depending on strength of the magnetic field.

The isolator 40 is disposed so that the laminated bodies 47 of the isolator element 40a are inserted into optical axes of the input ports 11 and that the transmitting means 40b is inserted into the optical axis of the output port 12.

The wavelength selective switch 301 is preferably disposed so that the lens array 20 and the first lens 30 form a confocal optical system and the second lens 50 and the spectral element 60 form a confocal optical system, respectively.

Next, operation of the wavelength selective switch 301 will be described with reference to FIGS. 4A and 4B. The wavelength-multiplexed light propagating through the waveguide 14 is emitted as the input light from the input port 11, is converted into a parallel light by the lens array 20, passes through the isolator element 40a of the isolator 40, is converged by the first lens 30, forms an image at the point A, turns into a diverging light again, enters the second lens 50 to be converted into a parallel light again, and enters the spectral element 60. In FIG. 4B, the input light from the input port 11b is shown by the one-dot chain lines and the input light from the input port 11c is shown by the two-dot chain lines. The respective input lights are reflected at different angles depending on the wavelengths in the direction of the x axis (λ1 to λ5 in FIG. 4) on the diffraction surface 62 of the spectral element 60. The respective reflected lights are converged by the second lens 50 and enter the mirror array 80.

Any of the lights of the wavelengths λ1 to λ5 separated by the spectral element 60 enter the micromirrors 80a to 80e of the mirror array 80. In other words, all the input lights from the input ports 11 are separated into the wavelengths λ1 to λ5 by the spectral element 60 and enter any of the micromirrors 80a to 80e. For example, the light of the wavelength λ1 out of the input light from the input port 11a enters the micromirror 80a and the light of the wavelength λ2 out of the input light from the input port 11a enters the micromirror 80b.

By changing inclination angles of the micromirrors 80a to 80e, it is possible to adjust directions of the respective lights reflected by them. For example, by adjusting the inclination angle of the micromirror 80c, the micromirror 80c can couple the light of the wavelength λ3 out of the input light (two-dot chain lines) from the input port 11c to the output port 12 as the output light (solid lines) as shown in FIG. 4B. Similarly, each of the other micromirrors can couple the light of the desired wavelength out of the desired input light to the output port 12.

However, the inclination angle of the micromirror 80c for coupling the light of the wavelength λ3 of the input light from the input port 11c to the output port 12 is an angle especially for the wavelength λ3 of the input light from the input port 11c and is not an angle for coupling the light of the wavelength λ3 of the input light from the other input port to the output port 12. For example, the light of the wavelength λ3 of the input light (one-dot chain lines) from the input port 11b is reflected by the micromirror 80c and then propagates through substantially the same light path (broken line) as the input light from the input port 11b. The wavelength selective switch 301 includes the isolator 40 for intercepting this light.

The light reflected by the mirror array 80 is converted into the parallel light by the second lens 50, reflected at the same angle as before in the direction of the x axis on the diffraction surface 62 of the diffraction grating 60, converged by the second lens 50, converted into the parallel light by the first lens 30, and applied to the isolator 40. The isolator 40 couples the output light to the lens array 20, because the transmitting means 40b is located on the optical axis of the output port 12. In the case in FIG. 4, for example, only the light of the wavelength λ3 of the input light from the input port 11c passes through the transmitting means 40b as the output light (solid lines) and is coupled to the lens array 20 corresponding to the output port 12. The output light is converged by the lens array 20 and enters the output port 12. The incident output light propagates through the waveguide 14g.

On the other hand, the isolator 40 prevents coupling of the light (broken line) that will not be the output light to the lens array 20, because the isolator element 40a is located on the optical axes of the input ports 11. In this way, the isolator 40 can couple only the selected light (the light of the wavelength λ3 of the input light from the input port 11c in the above example) out of the lights reflected by the mirror array 80 to the output port 12 and does not couple the lights that are not selected (the lights other than the light of the wavelength λ3 of the input light from the input port 11c in the above example) to the output port 12. As a result, the wavelength selective switch 301 does not couple the lights that are not selected to any of the input ports 11 to thereby suppress leakage of the light signal to the input side of the light signal.

As described above, by including one isolator 40, the wavelength selective switch 301 does not need in-line isolators that used to be necessary for respective input ports in prior art. Moreover, treatment of excessive lengths of fibers in a module and coupling of the in-line isolators and the waveguides become unnecessary. Therefore, with the wavelength selective switch 301, leakage of the light signals to the input ports can be suppressed and size and cost of the module can be reduced.

Figure 8:
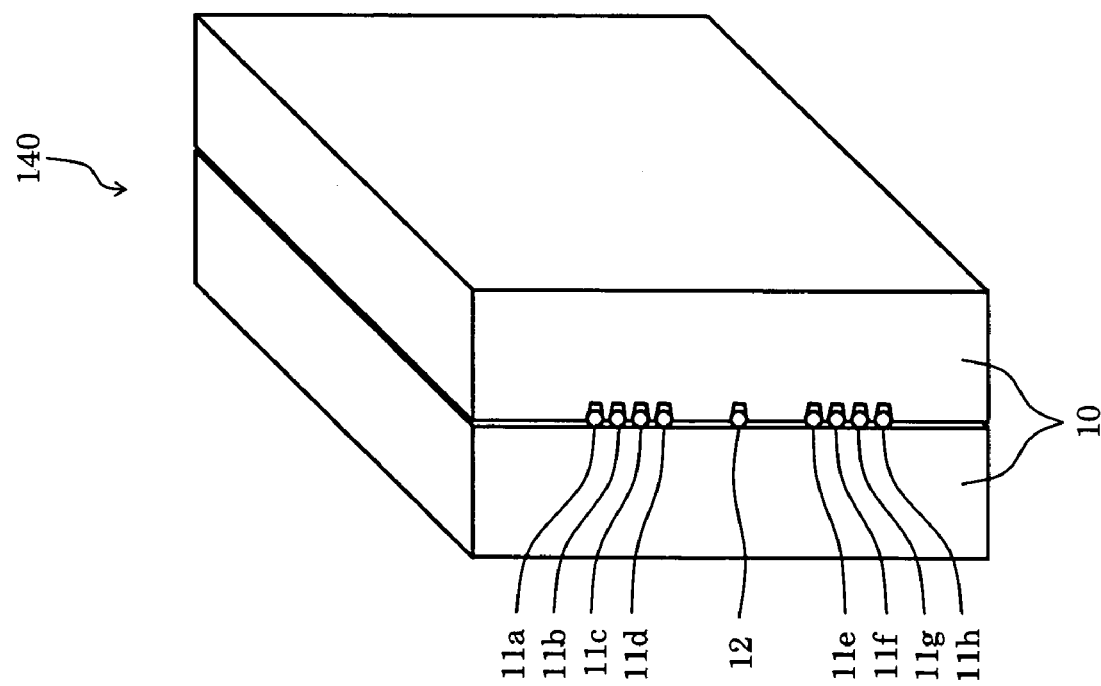
FIG. 8 is a schematic diagram for explaining a structure of a lens array.
Figure 9:
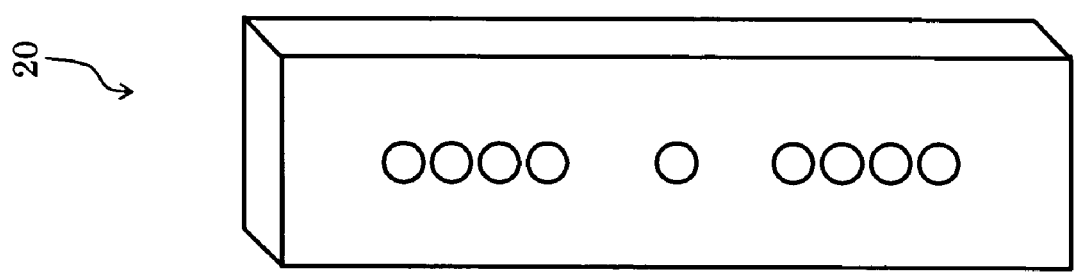
FIG. 9 is a schematic diagram for explaining a structure of a fiber array.
Figure 10:
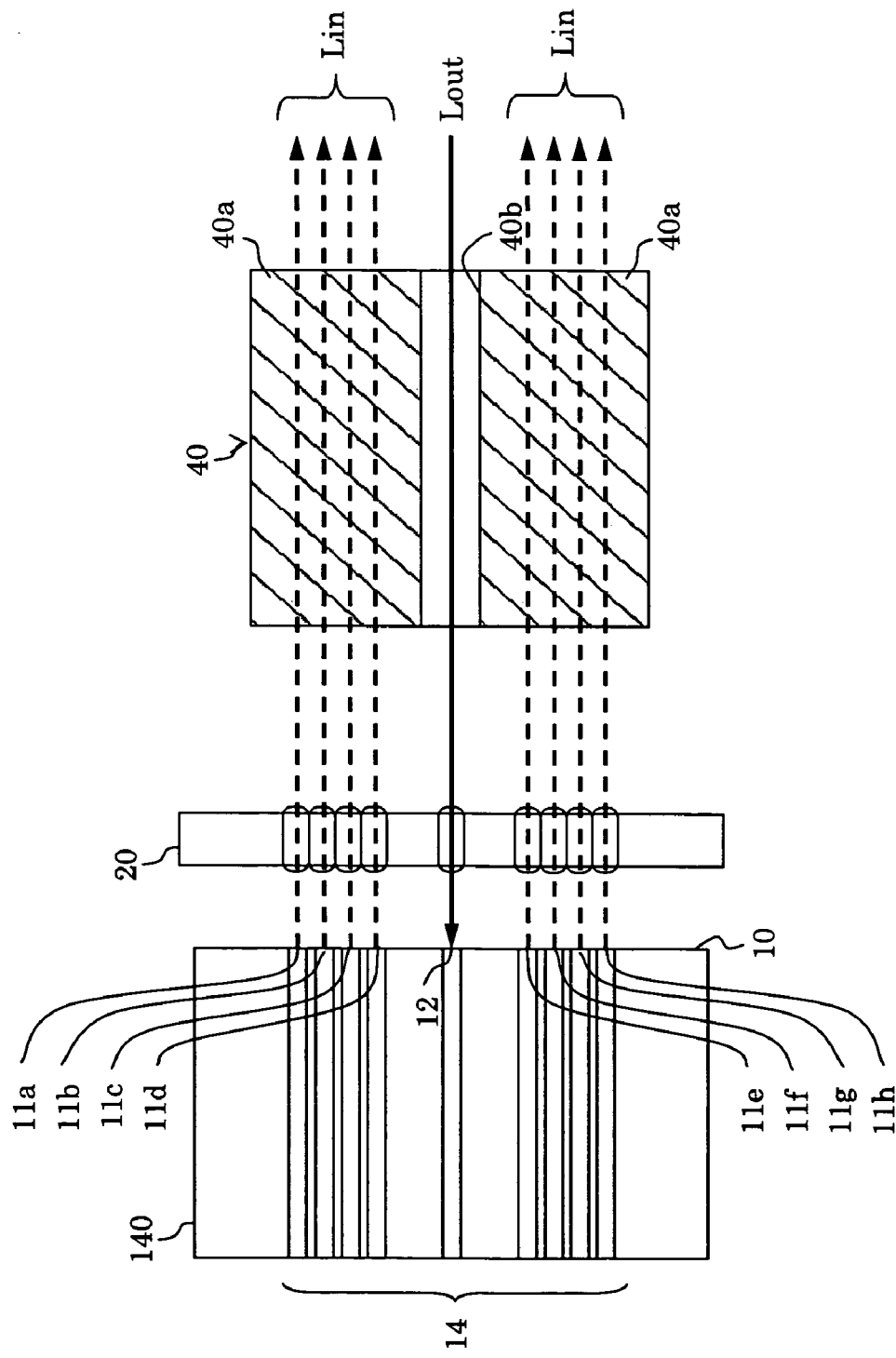
FIG. 10 is a schematic block diagram for explaining relationships between the isolator, the lens array, and the fiber array.

If the isolator 40 in FIG. 6 is used, the input ports 11 need be collected in two input port rows and the output port 12 need be located between the two input port rows at the input/output terminal 10 of the fiber array 140. At the input/output terminal 10, spaces between the input ports 11 and the output port 12 may be wider than those between the input ports 11. FIG. 8 shows the fiber array 140 in this case. FIG. 9 shows the lens array 20 in this case. FIG. 10 is a section along the YZ plane for explaining details of the portion M in FIG. 4A. Because the spaces between the output port and the input ports adjacent to it are wide, a vignetting loss of the reflected light signal that enters the output port can be suppressed and areas of the isolator element that cover the input ports adjacent to the output port can be increased to thereby obtain satisfactory isolation characteristics for all the input ports. There is also an effect of expanding mounting tolerance in forming the module.

Second Embodiment

FIGS. 11A and 11B are schematic block diagrams of a wavelength selective switch 302 of a second embodiment. FIG. 11A shows the wavelength selective switch 302 in an x-z plane and FIG. 11B shows the wavelength selective switch 302 in a y-z plane. Because parts provided with the same reference numerals in FIGS. 11A and 11B and FIG. 4 are the same as each other, they will not be described again.

The wavelength selective switch 302 has a transmissive structure. In other words, a spectral element 65 transmits lights. The wavelength selective switch 302 of the second embodiment includes: an input/output terminal 10 provided with a plurality of input ports 11 from which input lights including one or more wavelengths are input and an output port 12 to which an output light is output arranged in a straight row; a lens array 20 disposed to face the input/output terminal 10 to convert the respective input lights from the input ports 11 into parallel lights and to couple the output light to the output port 12; an isolator 40 disposed on an opposite side to the input/output terminal 10 with the lens array 20 interposed therebetween, having an isolator element 40a provided only on light paths of the input lights and shared among the light paths of the respective input lights to intercept lights propagating in an opposite direction to the input lights, and having a transmitting means 40b for transmitting the output light and coupling it to the lens array 20; a first lens 30 disposed on an opposite side to the lens array 20 with the isolator 40 interposed therebetween to converge the respective input lights from the isolator 40 on a focus A and diffuse them and to convert the output light into a parallel light and couple it to the transmitting means 40b of the isolator 40; a second lens 50 disposed on an opposite side to the isolator 40 with the first lens 30 interposed therebetween to convert the respective input lights from the first lens 30 into parallel lights and to converge the output light on the focus A, then diffuse it, and couple it to the first lens 30; a spectral element 65 disposed on an opposite side to the first lens 30 with the second lens 50 interposed therebetween to transmit the respective input lights at different angles for the respective wavelengths on a grating surface 67 formed by forming a plurality of gratings parallel to an arranged direction of the input ports 11 and the output ports 12 at the input/output terminal 10 on a face receiving the input lights and to transmit the output light as it is and couple it to the second lens 50; a third lens 70 disposed on an opposite side to the second lens 50 with the spectral element 65 interposed therebetween to individually converge lights of the respective wavelengths of the respective input lights from the spectral element 65 after the input lights are separated into the respective wavelengths and to convert the output light into a parallel light and couple it to the spectral element 65; and a mirror array 80 disposed on an opposite side to the spectral element 65 with the third lens 70 interposed therebetween, having micromirrors 80a to 80e for the respective wavelengths which are shared among the respective input lights and which lights of the respective wavelengths of the input lights enter, respectively, after the input lights are converged by the third lens 70, and reflecting a light of a desired wavelength of a desired input light as the output light to couple it to the output port 12 via the third lens 70, the spectral element 65, the second lens 50, the first lens 30, the isolator 40, and the lens array 20, in this order.

The grating surface 67 is similar to the grating surface 62 in FIG. 4. Therefore, as shown in FIG. 11A, the input lights that have passed through the second lens 50 are refracted on the grating surface 62 of the spectral element 65 and pass through at different angles for the respective wavelengths in the direction of the x axis.

The wavelength selective switch 302 is preferably disposed so that the second lens 50 and the third lens 70 form a confocal optical system, i.e., the third lens 70 is disposed so that the distance from the third lens 70 to the spectral element 65 may become equal to the distance from the spectral element 65 to the second lens 50.

Next, operation of the wavelength selective switch 302 will be described with reference to FIGS. 11A and 11B. Operation until the input lights enter the spectral element 65 and operation until the output light is coupled to the output port 12 are the same as those of the wavelength selective switch 301 in FIGS. 4A and 4B. The respective input lights pass through the diffraction surface 67 of the spectral element 65 at different angles depending on the wavelengths in the direction of the x axis (λ1 to λ5 in FIGS. 11A and 11B). The respective transmitted lights are converged by the third lens 70 and the lights of the respective wavelengths enter the micromirrors 80a to 80e of the mirror array 80, respectively.

Operation and reflection of the lights of the mirror array 80 are similar to those of the wavelength selective switch 301 in FIGS. 4A and 4B. Therefore, the mirror array 80 can couple the light of the desired wavelength of the desired input light to the output port 12 as the output light via the transmitting means 40b of the isolator 40. On the other hand, because the isolator element 40a of the isolator 40 functions as described in the description of the wavelength selective switch 301 in FIGS. 4A and 4B, it prevents coupling of the lights (broken lines) that will not be the output light to the lens array 20. Consequently, the wavelength selective switch 302 has the same effect as the wavelength selective switch 301.

The wavelength selective switch of the invention can demultiplex the light having different wavelengths and can be employed as an optical multi/demultiplexer for wavelength multiplexing in implementing an optical wavelength division multiplexing transmission network or a wavelength reconfigurable type add-drop wavelength multiplex circuit.

What is claimed is:

1. A wavelength selective switch comprising:
    an input/output terminal provided with a plurality of input ports from which input lights including one or more wavelengths are input and at least one output port to which an output light is output arranged in a straight row;
    a lens array disposed to face the input/output terminal to convert the respective input lights from the input ports into parallel lights and to couple the output light to the output port;
    an isolator disposed on an opposite side to the input/output terminal with the lens away interposed therebetween, having an isolator element provided on light paths of the input lights and shared among the light paths of the respective input lights to intercept lights propagating in an opposite direction to the input lights, and having a transmitting element provided on a light path of the output light to transmit the output light and couple it to the lens array;
    a first lens disposed on an opposite side to the lens array with the isolator interposed therebetween to converge the respective input lights from the isolator on a focus and diffuse them and to convert the output light into a parallel light and couple it to the transmitting element of the isolator;
    a second lens disposed on an opposite side to the isolator with the first lens interposed therebetween to convert the respective input lights from the first lens into parallel lights and to converge the output light on a focus, then diffuse it, and couple it to the first lens;
    a spectral element disposed on an opposite side to the first lens with the second lens interposed therebetween to reflect the respective input lights at different angles for the respective wavelengths on a grating surface formed by forming a plurality of gratings parallel to an arranged direction of the input ports and the output port at the input/output terminal on a face receiving the input lights and couple them again to the second lens and to reflect the output light as it is and couple it to the second lens; and
    a mirror array disposed on an opposite side to the spectral element with the second lens interposed therebetween while displaced from a central axis connecting the first lens and the second lens, having micromirrors for the respective wavelengths which lights of the respective wavelengths of the input lights enter individually after the input lights are reflected by the spectral element and the respective wavelengths of the input lights are converged by the second lens, and reflecting a light of a desired wavelength of a desired input light as the output light to couple it to the output port via the second lens, the spectral element, the second lens again, the first lens, the isolator, and the lens array, in this order.

2. The wavelength selective switch according to claim 1, wherein
    spaces between the input ports and the output ports are wider than spaces between the input ports at the input/output terminal.

3. The wavelength selective switch according to claim 1, wherein
    the isolator element of the isolator includes a laminated body formed by laminating a first doubly refracting crystal plate, a rotary polarizer, a compensator, and a second doubly refracting crystal plate in this order in a propagating direction of the input lights and a magnetic field device applying a magnetic field to the laminated body in a direction perpendicular to the propagating direction of the input lights and perpendicular to the port arranged direction in which the input ports and the output port of the input/output terminal are arranged.

4. The wavelength selective switch according to claim 2, wherein
    the isolator element of the isolator includes a laminated body formed by laminating a first doubly refracting crystal plate, a rotary polarizer, a compensator, and a second doubly refracting crystal plate in this order in a propagating direction of the input lights and a magnetic field device applying a magnetic field to the laminated body in a direction perpendicular to the propagating direction of the input lights and perpendicular to the port arranged direction in which the input ports and the output port of the input/output terminal are arranged.

5. The wavelength selective switch according to claim 3, wherein
    the input ports are collected in two input port rows and the output port is disposed between the two input port rows at the input/output terminal and the two laminated bodies with their first doubly refracting crystal plates, rotary polarizers, compensators, and second doubly refracting crystal plates arranged in the same order are disposed on both sides of the transmitting element in the port arranged direction and the two magnetic field devices are arranged to sandwich the two laminated bodies and the transmitting element in the direction perpendicular to the port arranged direction and the propagating direction of the input lights in the isolator element of the isolator.

6. The wavelength selective switch according to claim 4, wherein
the input ports are collected in two input port rows and the output port is disposed between the two input port rows at the input/output terminal and the two laminated bodies with their first doubly refracting crystal plates, rotary polarizers, compensators, and second doubly refracting crystal plates arranged in the same order are disposed on both sides of the transmitting element in the port arranged direction and the two magnetic field devices are arranged to sandwich the two laminated bodies and the transmitting element in the direction perpendicular to the port arranged direction and the propagating direction of the input lights in the isolator element of the isolator.

7. A wavelength selective switch comprising:
an input/output terminal provided with a plurality of input ports from which input lights including one or more wavelengths are input and at least one output port to which an output light is output arranged in a straight row;
a lens array disposed to face the input/output terminal to convert the respective input lights from the input ports into parallel lights and to couple the output light to the output port;
an isolator disposed on an opposite side to the input/output terminal with the lens array interposed therebetween, having an isolator element provided on light paths of the input lights and shared among the light paths of the respective input lights to intercept lights propagating in an opposite direction to the input lights, and having a transmitting element provided on a light path of the output light to transmit the output light and couple it to the lens array;
a first lens disposed on an opposite side to the lens array with the isolator interposed therebetween to converge the respective input lights from the isolator on a focus and diffuse them and to convert the output light into a parallel light and couple it to the transmitting element of the isolator;
a second lens disposed on an opposite side to the isolator with the first lens interposed therebetween to convert the respective input lights from the first lens into parallel lights and to converge the output light on a focus, then diffuse it, and couple it to the first lens;
a spectral element disposed on an opposite side to the first lens with the second lens interposed therebetween to transmit the respective input lights at different angles for the respective wavelengths on a grating surface formed by forming a plurality of gratings parallel to an arranged direction of the input ports and the output port at the input/output terminal on a face receiving the input lights and to transmit the output light as it is and couple it to the second lens;
a third lens disposed on an opposite side to the second lens with the spectral element interposed therebetween to individually converge lights of the respective wavelengths of the respective input lights from the spectral element after the input lights are separated into the respective wavelengths and to convert the output light into a parallel light and couple it to the spectral element; and
a mirror away disposed on an opposite side to the spectral element with the third lens interposed therebetween, having micromirrors for the respective wavelengths which are shared among the respective input lights and which lights of the respective wavelengths of the input lights enter, respectively, after the input lights are converged by the third lens, and reflecting a light of a desired wavelength of a desired input light as the output light to couple it to the output port via the third lens, the spectral element, the second lens, the first lens, the isolator, and the lens array, in this order.

8. The wavelength selective switch according to claim 7, wherein
spaces between the input ports and the output ports are wider than spaces between the input ports at the input/output terminal.

9. The wavelength selective switch according to claim 7, wherein
the isolator element of the isolator includes a laminated body formed by laminating a first doubly refracting crystal plate, a rotary polarizer, a compensator, and a second doubly refracting crystal late in this order in a propagating direction of the input lights and a magnetic field device applying a magnetic field to the laminated body in a direction perpendicular to the propagating direction of the input lights and perpendicular to the port arranged direction in which the input ports and the output port of the input/output terminal are arranged.

10. The wavelength selective switch according to claim 8, wherein
the isolator element of the isolator includes a laminated body formed by laminating a first doubly refracting crystal plate, a rotary polarizer, a compensator, and a second doubly refracting crystal plate in this order in a propagating direction of the input lights and a magnetic field device applying a magnetic field to the laminated body in a direction perpendicular to the propagating direction of the input lights and perpendicular to the port arranged direction in which the input ports and the output port of the input/output terminal are arranged.

11. The wavelength selective switch according to claim 9, wherein
the input ports are collected in two input port rows and the output port is disposed between the two input port rows at the input/output terminal and the two laminated bodies with their first doubly refracting crystal plates, rotary polarizers, compensators, and second doubly refracting crystal plates arranged in the same order are disposed on both sides of the transmitting element in the port arranged direction and the two magnetic field devices are arranged to sandwich the two laminated bodies and the transmitting element in the direction perpendicular to the port arranged direction and the propagating direction of the input lights in the isolator element of the isolator.

12. The wavelength selective switch according to claim 10, wherein
the input ports are collected in two input port rows and the output port is disposed between the two input port rows at the input/output terminal and the two laminated bodies with their first doubly refracting crystal plates, rotary polarizers, compensators, and second doubly refracting crystal plates arranged in the same order are disposed on both sides of the transmitting element in the port arranged direction and the two magnetic field devices are arranged to sandwich the two laminated bodies and the transmitting element in the direction perpendicular to the port arranged direction and the propagating direction of the input lights in the isolator element of the isolator.

* * * * *